United States Patent [19]

Yamashita et al.

[11] Patent Number: 5,052,897
[45] Date of Patent: Oct. 1, 1991

[54] COMPRESSOR AND METHOD OF DETECTING QUANTITY OF MIXTURE OF COOLANT AND LUBRICANT IN THE COMPRESSOR

[75] Inventors: Tetsuji Yamashita; Yukinobu Takahashi, both of Yokohama, Japan

[73] Assignee: Kabushiki Kaisha Toshiba, Kawasaki, Japan

[21] Appl. No.: 606,816

[22] Filed: Oct. 31, 1990

[30] Foreign Application Priority Data

Oct. 31, 1989 [JP] Japan ............................ 1-281989

[51] Int. Cl.$^5$ ............................................. F04B 39/04
[52] U.S. Cl. ............................... 417/228; 417/13; 184/6.3; 184/6.4
[58] Field of Search ........................ 184/6.3, 6.4, 6.22, 184/108; 417/228, 13

[56] References Cited

U.S. PATENT DOCUMENTS

| | | | |
|---|---|---|---|
| 2,453,584 | 11/1948 | Newton | 62/225 |
| 3,876,037 | 4/1975 | Rath | 184/6.4 |
| 4,066,869 | 1/1978 | Apaloo et al. | 219/490 |
| 4,745,893 | 5/1988 | Atherton | 184/6.4 |

FOREIGN PATENT DOCUMENTS

| | | |
|---|---|---|
| 300866 | 1/1989 | European Pat. Off. |
| 2617177 | 10/1976 | Fed. Rep. of Germany ...... 184/108 |
| 57-115974 | 10/1973 | Japan |
| 301746 | 2/1935 | United Kingdom |

Primary Examiner—Leonard E. Smith
Assistant Examiner—Peter Korytnyk
Attorney, Agent, or Firm—Foley & Lardner

[57] ABSTRACT

A compressor has a motor and a compressor mechanism connected to the motor. The motor has a coil and is lubricated with lubricant. The compressor mechanism sucks and compresses low-pressure coolant and discharges high-pressure coolant. The compressor comprises a unit for preheating the lubricant, and a unit for detecting line-to-line impedance of the coil of the motor to know the quantity of a mixture of liquified coolant and the lubricant, and controlling activation of the preheating unit and of the compressor according to a result of the detection.

5 Claims, 5 Drawing Sheets 5,052,897

COMPRESSOR AND METHOD OF DETECTING QUANTITY OF MIXTURE OF COOLANT AND LUBRICANT IN THE COMPRESSOR

BACKGROUND OF THE INVENTION

1. Field of the Invention

The present invention relates to a compressor, and particularly to a method and an apparatus for detecting the quantity of a mixture of coolant and lubricant contained in the compressor.

2. Description of the Prior Art

Heat pumps used as heating sources and the heat absorbing sources of freezers employ gaseous coolant such as Freon that is easy to liquefy. In the heat pump, a compressor compresses the coolant into a high-temperature high-pressure gas, and a condenser removes heat from the coolant to liquefy the same. Thereafter, an expander expands the liquefied coolant, and an evaporator lets the coolant absorb heat. The coolant then becomes a low-pressure gas to complete a freezing cycle.

During the stoppage of operation of the compressor of the heat pump particularly in a low ambient temperature, for example in winter, the gaseous coolant may liquefy and flow back into the compressor. IF this happens, the liquefied coolant mixes with lubricant contained inside the compressor, thereby diluting the lubricant. If the dilution is excessive to soften the viscosity of the lubricant, the lubricant may not sufficiently function and cause locking, abrasion, etc., on rotating and wobbling parts of the compressor mechanism.

To avoid such trouble, the lubricant in the compressor is usually preheated before starting the heat pump to operate. This will be explained with reference to FIG. 1. The figure shows a vertical-closed-type rotary compressor. The compressor comprises a closed casing 1 which accommodates a motor 4 and a compressor mechanism 5 connected to a lower part of the motor 4. The motor 4 comprises a rotor 2, a stator 3, and a stator coil 3c. A low pressure coolant gas is sucked through a suction pipe 6, and a high-pressure coolant gas is discharged through a discharge pipe 7. The motor 4 receives electric power through terminals 8 and lead wires 9. The closed casing 1 contains lubricant 10 that is at a low level L in the figure. A preheater coil 11 is wound around a lower part of the casing 1 where the lubricant 10 is stored.

FIG. 2 shows an alternative of the heater. In this figure, a heater 12 and a heater case 13 enclosing the heater 12 are inserted into a lower part of the closed casing 1.

FIG. 3 shows a sequence of operations of the heat pump. Before starting the heat pump, the heater coil 11 or heater 12 preheats the lubricant 10 for a predetermined time period, thereby evaporating and removing the coolant mixed with the lubricant 10. Here, the lubricant 10 is preheated on an assumption that is contains mixed coolant at the start of the heat pump. Namely, irrespective of a light or heavy quantity of the coolant mixed with the lubricant, the preheating of the lubricant is always carried out for a predetermined time period.

This technique, therefore, wastes preheating power and time, if no coolant is mixed with the lubricant, or if only a small quantity of coolant that does not bother the function of the lubricant is mixed with the lubricant. Another problem of this technique is that the compressor of the heat pump is activated only after the termination of the preheating, thereby delaying the start of operation of the heat pump.

SUMMARY OF THE INVENTION

To solve these problems, an object of the present invention is to provide a compressor that employs a method and an apparatus for easily detecting the quantity of a mixture of lubricant and coolant in the compressor.

In order to accomplish the object, a compressor according to the present invention comprises a motor and a compressor mechanism connected to the motor. The motor has a coil and is lubricated with lubricant. The compressor mechanism driven by the motor sucks and compresses low-pressure coolant, and discharges high-pressure coolant. The compressor further comprises means for detecting the quantity of a mixture of liquefied coolant and the lubricant according to line-to-line impedance of the coil of the motor.

The method of detecting the quantity of the mixture of the lubricant and coolant is based on the fact that the line-to-line impedance of the coil of the motor changes in response to a level of the mixture, i.e., the quantity of the mixture. Since the quantity of the mixture is detected as the line-to-line impedance of the coil, no special sensors are required for the detection, and no change will be made on the compressor proper for the detection. The compressor will be preheated according to a result of the detection, so that no preheating power and time may be wasted, and the compressor may quickly be started.

These and other objects, features and advantages of the present invention will be more apparent from the following detailed description of preferred embodiments in conjunction with the accompanying drawings.

DETAILED DESCRIPTION OF THE EMBODIMENTS

Figure 4:
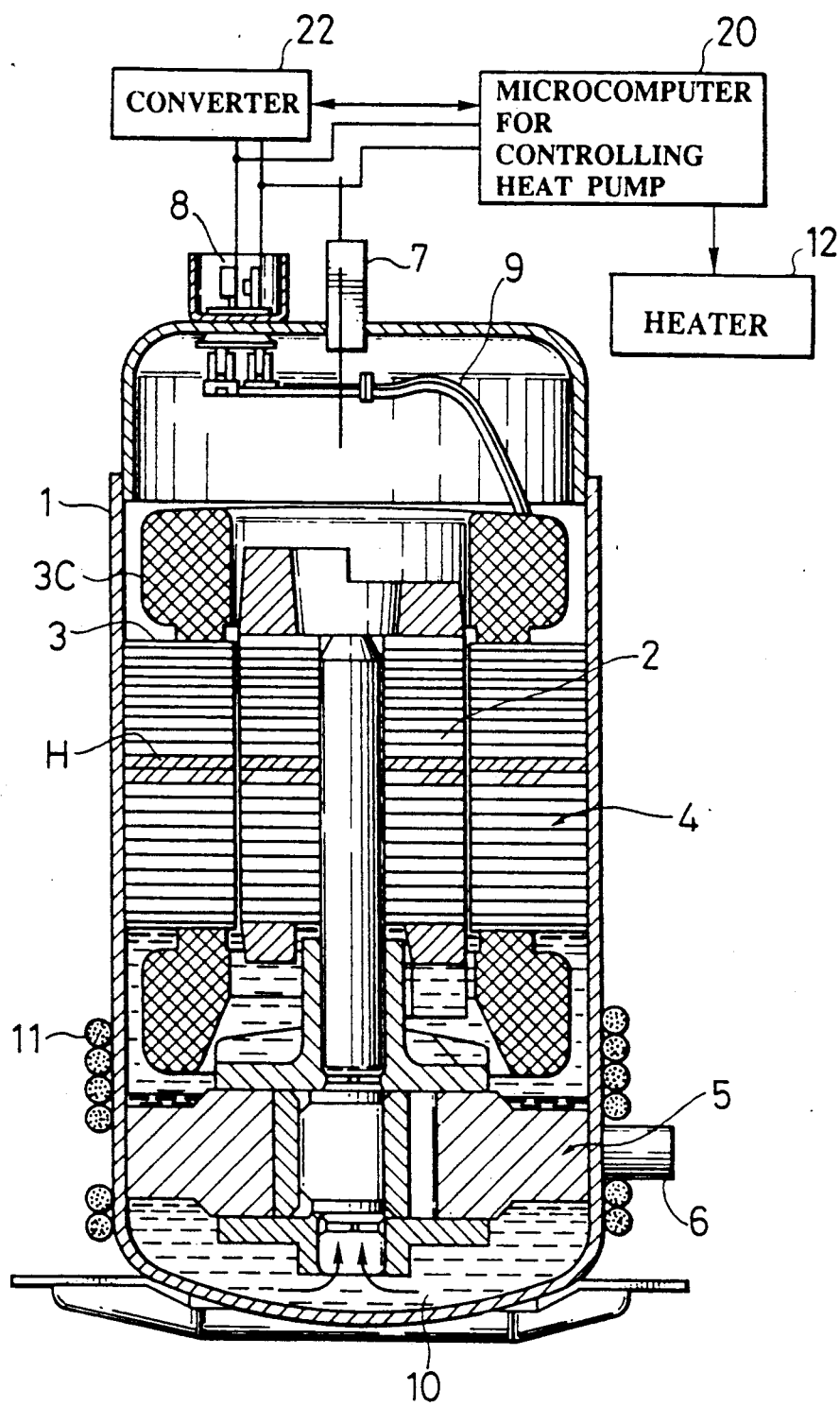
FIG. 4 is a sectional view showing a closed rotary compressor according to an embodiment of the present invention.

The embodiment of the present invention will be explained with reference to FIGS. 4 to 7. In FIG. 4, the same reference numerals as those of FIG. 1 represent like parts.

In FIG. 4, liquefied coolant is mixed with lubricant 10, and therefore, the level of the mixture of the lubricant and coolant is high (H) in a compressor of a heat pump.

Figure 1:
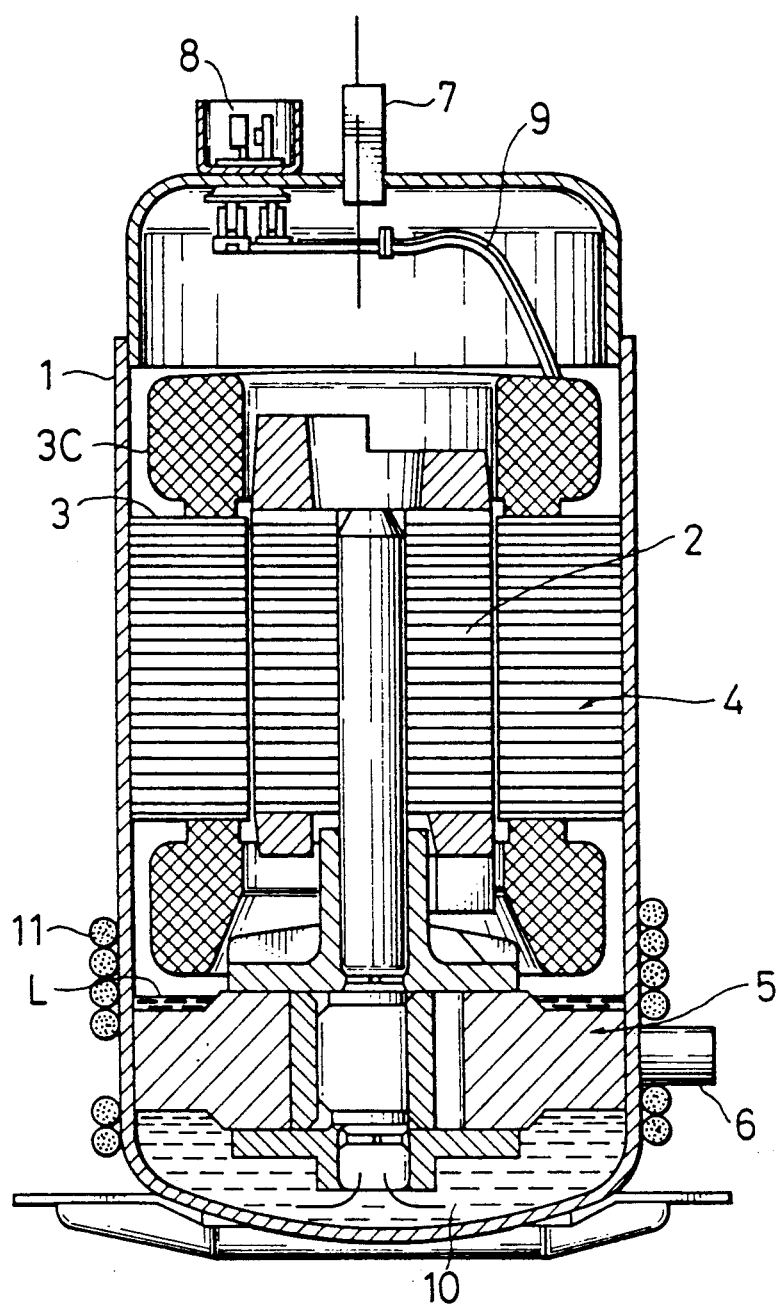
FIG. 1 is a sectional view showing a closed rotary compressor.
Figure 6:
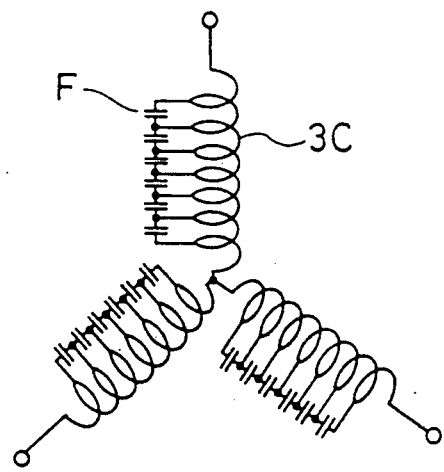
FIG. 6 is an explanatory view of line-to-line capacitance of a coil.

In this high level state, or in the low level state of FIG. 1, a microcomputer 20 for controlling the heat pump measures, before starting the compressor, line-to-line impedance of a stator coil 3c (or a rotor coil if it is disposed) of a motor 4. This line-to-line impedance may be line-to-line capacitance F of the stator coil 3c as shown in FIG. 6. The capacitance changes in response to the level of the mixture of lubricant and coolant. Namely, the level of the mixture may be determined by measuring the capacitance.

Generally, capacitance between electrodes is proportional to areas of the electrodes and the dielectric constant of a dielectric interposing between the electrodes. This means that the line-to-line capacitance of the stator coil 3c changes if an interposing area of the mixture of lubricant and coolant changes or if a dielectric constant of the mixture changes. Even when the dielectric constant does not change, the line-to-line capacitance will increase when the level of the mixture rises, i.e., when the stator coil 3c is soaked in the mixture deeper.

With Freon R22 used as the coolant, a proportion of dielectric constants of gasified coolant, lubricant and liquefied coolant is about 1:2:6.6, so that a dielectric constant of the mixture of the lubricant and liquefied coolant may be between 2 to 6.6. Since the quantity of the lubricant is substantially constant, the dielectric constant of the mixture will increase as the quantity of the mixture increases, i.e., as the quantity of the liquefied coolant mixed with the lubricant increases.

Figure 5:
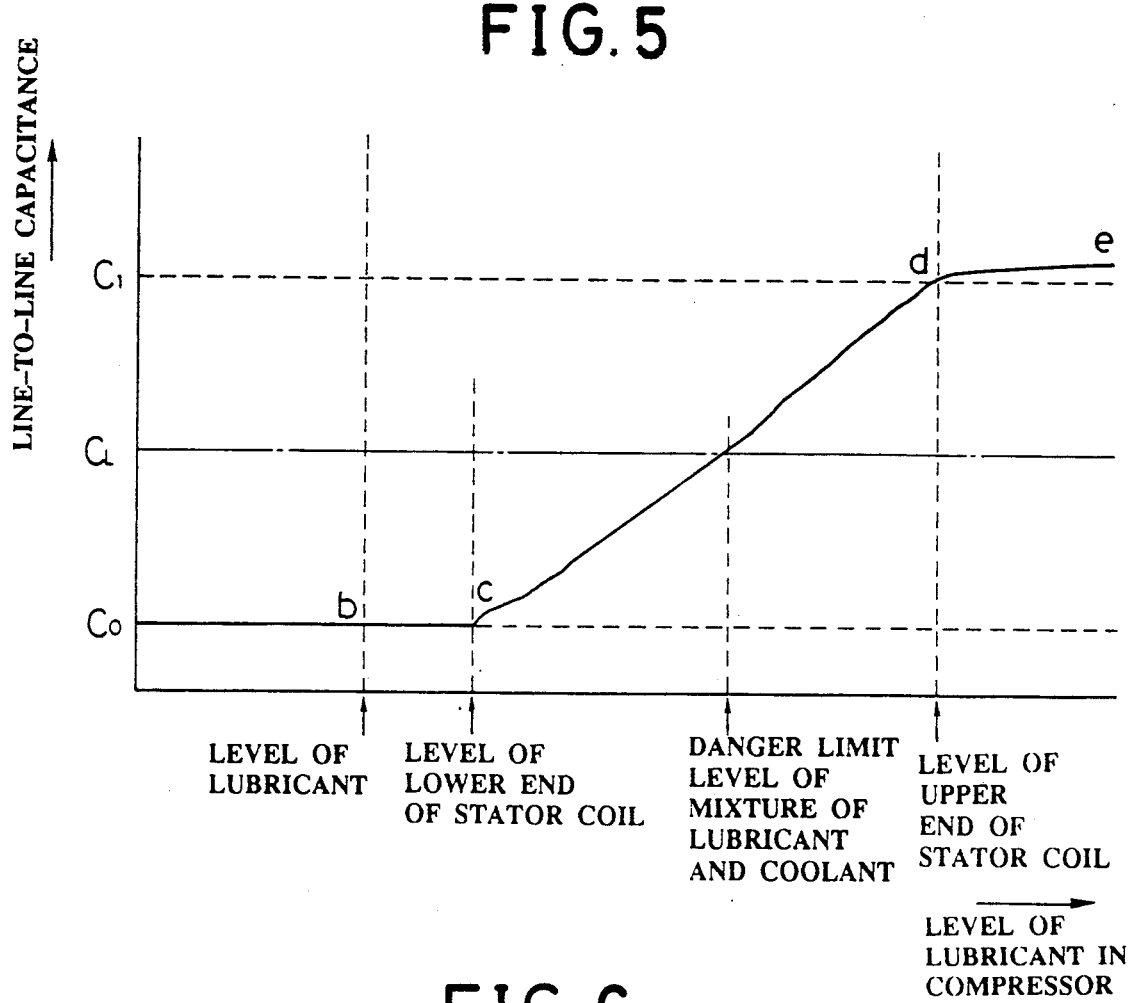
FIG. 5 is a graph showing relations between line-to-line capacitance of a coil and a level of a mixture of lubricant and coolant in the compressor.

As shown in FIG. 5, when the level of the lubricant reaches a lower end of the stator coil 3c, the line-to-line capacitance starts to change, and as the level rises higher, the line-to-line capacitance becomes larger in proportion to an increase in the dielectric constant and an increase in an interposing area of the mixture of the lubricant and coolant.

The microcomputer 20 for controlling and driving the stator coil 3c of the motor 4 is programmed to measure the line-to-line capacitance of the stator coil 3c before starting the compressor.

The capacitance may be used as it is, or converted into a frequency or a voltage by a converter 22 as shown in FIG. 4, for the sake of easy data handling of the microcomputer 20.

In FIG. 5, CO is line-to-line capacitance of the stator coil 3c at which no coolant mixes with the lubricant, and CL is limit capacitance at which the coolant mixed with the lubricant may cause trouble such as locking and abrasion if the compressor is started at this level. If the quantity of the mixture of the coolant and lubricant provides capacitance in a range between CO and CL, no locking and abrasion may occur even if no preheating is carried out on the compressor, and the coolant mixed with the lubricant may evaporate during the operation of the compressor.

Figure 2:
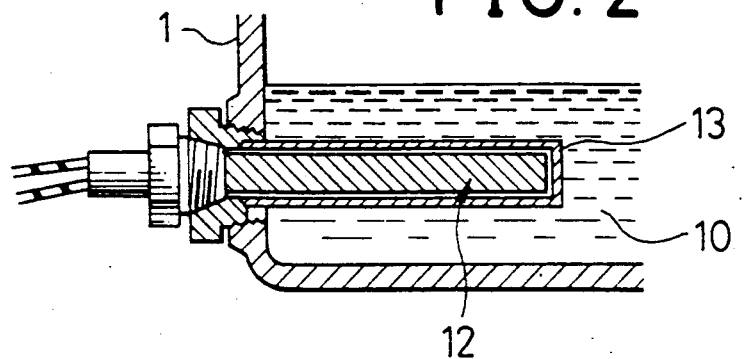
FIG. 2 is a sectional view showing a modification of a heater of the compressor of FIG. 1.

If the capacitance is larger than CL, the quantity of the coolant mixed with the lubricant is excessive to break the compressor down. In this case, the compressor must be preheated by a heater 12 (shown in FIG. 4) which is same as that shown in FIG. 2 and started after the capacitance is brought below CL to avoid the trouble to occur on the compressor.

The microcomputer 20 for controlling the heat pump is programmed to measure the line-to-line capacitance before activating the compressor, and if the measured value is smaller than the limit capacitance CL, activate the compressor at once. If the measured value is larger than the limit CL, the program of the microcomputer 20 preheats the lubricant in the compressor for a predetermined time period by the heater 12 and activates the compressor after the capacitance becomes smaller than the limit CL.

Figure 3:
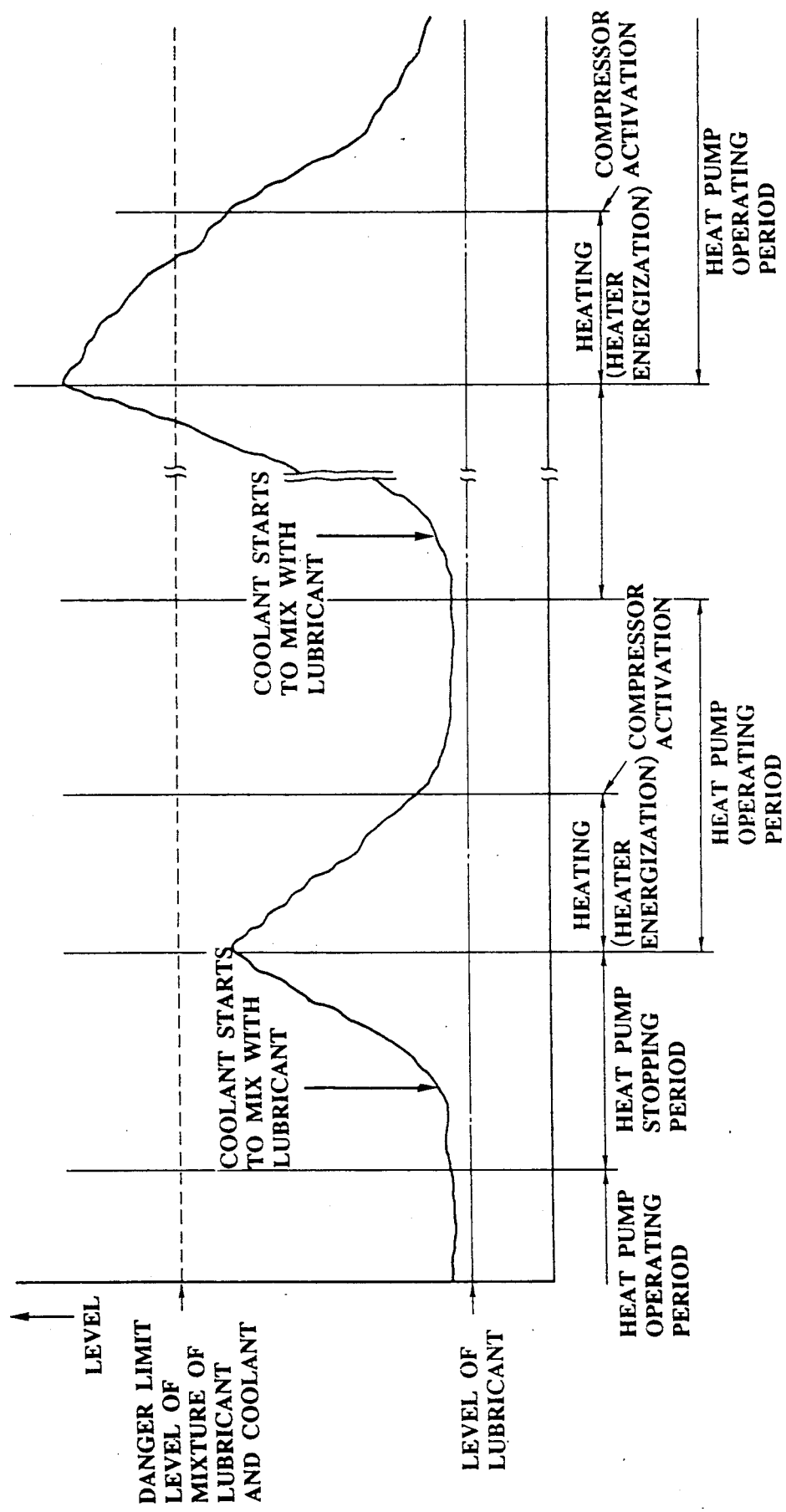
FIG. 3 is graph showing a sequence of operations of a compressor according to a prior art.
Figure 7:
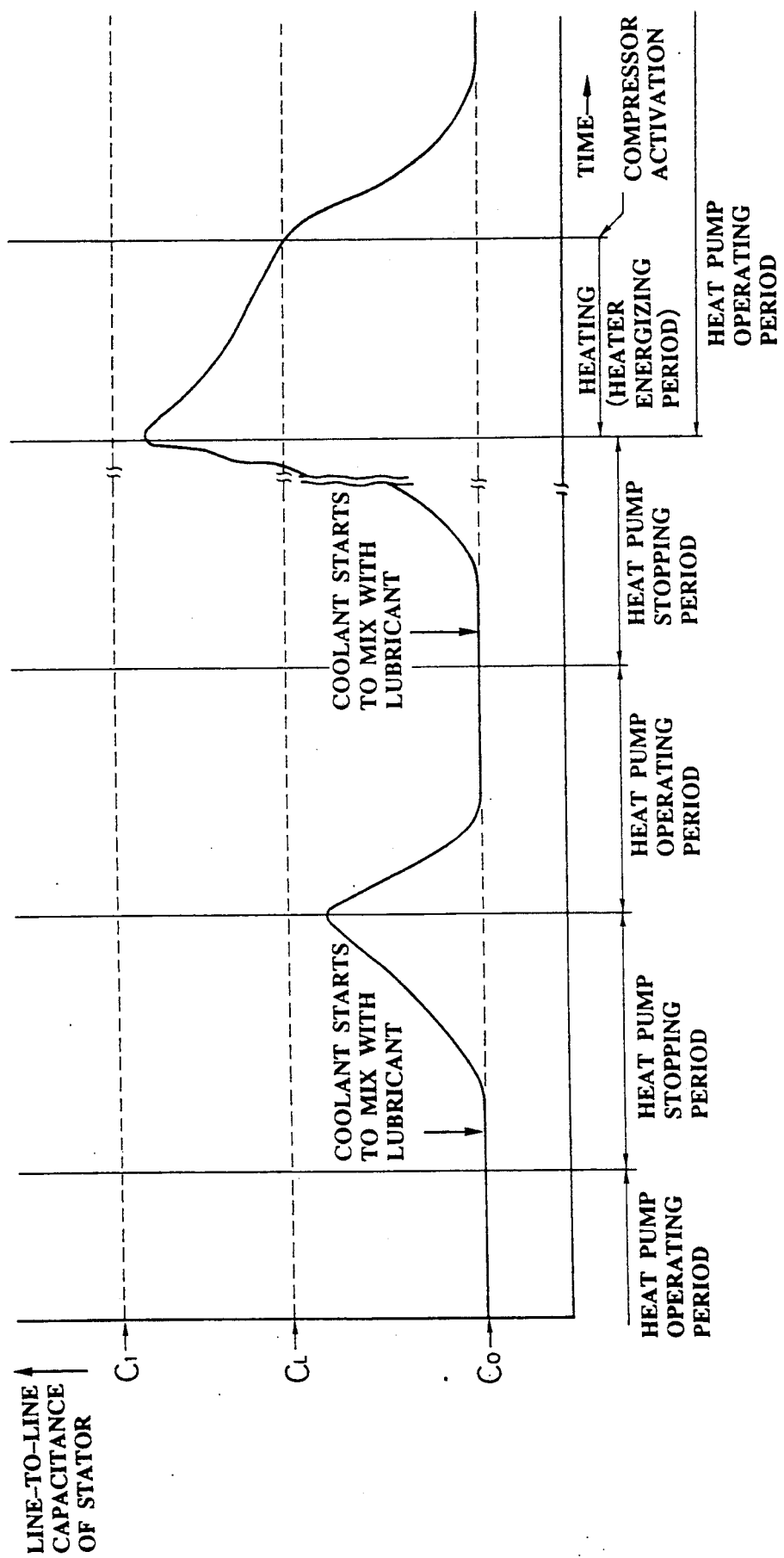
FIG. 7 is a graph showing a sequence of operations of the compressor according to the embodiment of the present invention.

FIG. 7 shows a graph similar to that of FIG. 3. The graph of FIG. 7 shows a sequences of operations of the heat pump in the case of starting the compressor without preheating the compressor and in the case of starting the compressor with preheating the compressor. In the case of preheating the compressor, the microcomputer 20 for controlling the heat pump monitors and judges whether or not measured line-to-line capacitance Cn is smaller than the limit capacitance CL, and starts the compressor if the measured value Cn is smaller than the limit CL. If the measured value is larger than the limit CL, a timer may be operated according to the measured value to preheat the compressor for a time period that is determined by the measured value.

In this way, this embodiment detects line-to-line capacitance of the motor coil, and if a result of the detection tells that the level of the mixture of the lubricant and coolant is low and that the lubricant sufficiently functions, starts the compressor at once without preheating the lubricant in the compressor. Only when the level of the mixture is high to indicate that the lubricant is excessively diluted, the embodiment preheats the lubricant, thereby saving power consumption and time.

In summary, the present invention utilizes the fact that line-to-line impedance of a coil of a motor of a compressor changes in proportion to the level of a mixture of lubricant and coolant that soak the coil, and detects the line-to-line impedance to know the quantity of the mixture. The present invention needs no special sensors for detecting the quantity of the mixture of coolant and lubricant, and can detect the quantity of the mixture without changing the structure of the compressor. According to the detected quantity of the mixture, the present invention preheats, if necessary, the compressor before starting the operation of the compressor, thereby saving power consumption for the preheating and realizing quick activation of the compressor.

Various modifications will become possible for those skilled in the art after receiving the teachings of the present disclosure without departing from the scope thereof.

What is claimed is:

1. In a compressor having a motor and a compressor mechanism connected to the motor, the motor having a coil and being lubricated with lubricant, the compressor mechanism sucking and compressing low-pressure coolant and discharging high-pressure coolant,
   a method of detecting the quantity of a mixture of liquefied coolant and the lubricant comprising the step of:
   detecting line-to-line impedance of the coil of the motor to know the quantity of the mixture.

2. The method as claimed in claim 1, wherein the line-to-line impedance of the coil is detected as capacitance.

3. The method as claimed in claim 1, wherein the capacitance is converted into a frequency and/or a voltage.

4. A compressor having a motor and a compressor mechanism connected to the motor, the motor having a coil and being lubricated with lubricant, the compressor mechanism sucking and compressing low-pressure coolant and discharging high-pressure coolant, the compressor comprising:
   means for preheating the lubricant; and means for detecting line-to-line impedance of the coil of the motor to know the quantity of a mixture of liquefied coolant and the lubricant, and controlling activation of said preheating means and of the compressor according to a result of the detection.

5. The compressor as claimed in claim 4, wherein said detecting and controlling means activates the compressor when the detected line-to-line impedance is smaller than a predetermined value, and when the detected line-to-line impedance is larger than the predetermined value, firstly activates said preheating means to preheat the lubricant and secondly activates the compressor.

* * * * *